United States Patent
Kim et al.

(10) Patent No.: US 12,108,264 B2
(45) Date of Patent: Oct. 1, 2024

(54) COMMUNICATION NODE AND OPERATING METHOD OF THE COMMUNICATION NODE, AND DISTRIBUTED ANTENNA SYSTEM INCLUDING THE SAME

(71) Applicant: SOLiD, INC., Seongnam-si (KR)

(72) Inventors: Ok Jin Kim, Seongnam-Si (KR); Min Chang Lee, Seongnam-Si (KR)

(73) Assignee: SOLiD, INC., Seongnam-si (KR)

( * ) Notice: Subject to any disclaimer, the term of this patent is extended or adjusted under 35 U.S.C. 154(b) by 541 days.

(21) Appl. No.: 17/436,905

(22) PCT Filed: Mar. 4, 2020

(86) PCT No.: PCT/KR2020/003069
§ 371 (c)(1),
(2) Date: Oct. 28, 2021

(87) PCT Pub. No.: WO2020/184891
PCT Pub. Date: Sep. 17, 2020

(65) Prior Publication Data
US 2022/0141682 A1    May 5, 2022

(30) Foreign Application Priority Data
Mar. 8, 2019  (KR) .......................... 10-2019-0026735

(51) Int. Cl.
*H04W 24/04* (2009.01)
*H04W 72/044* (2023.01)
*H04W 88/08* (2009.01)

(52) U.S. Cl.
CPC ......... *H04W 24/04* (2013.01); *H04W 72/044* (2013.01); *H04W 88/085* (2013.01)

(58) Field of Classification Search
CPC . H04B 10/25753; H04B 10/07; H04W 24/04; H04W 72/044; H04W 88/085; H04W 24/02
See application file for complete search history.

(56) References Cited

U.S. PATENT DOCUMENTS 9,179,321 B2    11/2015  Hasarchi et al.
2015/0326481 A1*  11/2015  Rector .................. H04W 72/56
                                                                370/236

(Continued)

FOREIGN PATENT DOCUMENTS

| KR | 10-2014-0122220 A | 10/2014 |
| KR | 10-2015-0033122 A | 4/2015 |
| KR | 10-2017-0091745 A | 8/2017 |

OTHER PUBLICATIONS

International Search Report for PC/KR2020/003069 dated Jun. 15, 2020 [PCT/ISA/210].

(Continued)

*Primary Examiner* — Khoa Huynh
(74) *Attorney, Agent, or Firm* — Sughrue Mion, PLLC (57) ABSTRACT

Provided are a communication node which comprises a signal monitoring device configured to receive a plurality of communication signals transmitted from two or more base stations, and to monitor a bandwidth of each of the received communication signals, a frame setter configured to reset a frame structure by merging at least some of blocks in a preset frame structure according to a result of the monitoring, and a framer configured to frame the plurality of communication signals into one frame by including the plurality of communication signals in a block corresponding to a bandwidth of each of the plurality of communication signals according to the reset frame structure.

10 Claims, 7 Drawing Sheets

(56) References Cited

U.S. PATENT DOCUMENTS

| | | | |
|---|---|---|---|
| 2015/0341089 A1* | 11/2015 | Kummetz | H04L 27/0002 |
| | | | 375/267 |
| 2016/0211893 A1 | 7/2016 | Kim et al. | |
| 2018/0027431 A1 | 1/2018 | Cho et al. | |
| 2018/0175938 A1 | 6/2018 | You | |
| 2019/0058618 A1 | 2/2019 | Kummetz et al. | |
| 2019/0394000 A1* | 12/2019 | Kim | H04L 5/0053 |

OTHER PUBLICATIONS

Written Opinion for PC/KR2020/003069 dated Jun. 15, 2020 [PCT/ISA/237].

Notification of Reason for Refusal Application No. 10-2019-0026735 dated Mar. 8, 2019.

Extended European Search Report issued Nov. 25, 2022 in European Application No. 20770231.7.

* cited by examiner

COMMUNICATION NODE AND OPERATING METHOD OF THE COMMUNICATION NODE, AND DISTRIBUTED ANTENNA SYSTEM INCLUDING THE SAME

TECHNICAL FIELD

The present disclosure relates to a communication node and an operating method thereof, and a distributed antenna system including the same, and more particularly, to a communication node capable of framing a plurality of communication signals by resetting a preset frame structure according to a monitoring result of a bandwidth of each of the plurality of communication signals and a method of operation thereof, and a distributed antenna system including the same.

BACKGROUND ART

A distributed antenna system (DAS) is a system that may solve the problem of communication shadow areas or high traffic concentration in a specific area by spatially distributing a plurality of antennas.

The DAS is installed in buildings, tunnels, subways, etc. to provide communication services even to a shadow area where base transceiver station signals are difficult to reach. The DAS is also used to provide smooth services in stadiums, large-sized facilities, and places where service demand is high.

The DAS may receive various communication signals from a plurality of base stations, frame the received signals, and distribute and transmit the received signals to various locations.

DESCRIPTION OF EMBODIMENTS

Technical Problem

Provided are a communication node capable of framing a plurality of communication signals by resetting a preset frame structure according to a monitoring result of a bandwidth of each of the plurality of communication signals and a method of operation thereof, and a distributed antenna system including the same.

Solution to Problem

According to an aspect of an embodiment, a communication node may comprise a signal monitoring device configured to receive a plurality of communication signals transmitted from two or more base stations, and to monitor a bandwidth of each of the received communication signals, a frame setter configured to reset a frame structure by merging at least some of blocks in a preset frame structure according to a result of the monitoring, and a framer configured to frame the plurality of communication signals into one frame by including the plurality of communication signals in a block corresponding to a bandwidth of each of the plurality of communication signals according to the reset frame structure.

According to an aspect of an embodiment, the preset frame structure may comprise a plurality of blocks configured with two or more types of block sizes.

According to an aspect of an embodiment, the frame setter may merge blocks having the same block size with respect to some of the plurality of blocks in the preset frame structure, and may merge blocks having different block sizes with respect to some other blocks.

According to an aspect of an embodiment, the frame setter may set the frame structure by determining a composition ratio of blocks for each type of block size in the preset frame structure according to the monitoring result of the signal monitoring device.

According to an aspect of an embodiment, the frame setter may set the frame structure by determining a composition ratio of blocks for each type of block size in the preset frame structure based on location information where the communication node is installed.

According to an aspect of an embodiment, the framer first may allocate a block included in the frame to a communication signal having a relatively large bandwidth from among the plurality of communication signals, and may comprise the communication signal in the block.

According to an aspect of an embodiment, a distributed antenna system may comprise a main headend device, and a plurality of extended headend devices each configured to receive a plurality of communication signals transmitted from a base station hotel including two or more base stations, and to frame the received communication signals into one frame and transmit the frame to the main headend device devices, wherein each of the plurality of extended headend devices comprises a signal monitoring device configured to receive the plurality of communication signals and to monitor a bandwidth of each of the received communication signals, a frame setter configured to reset a frame structure by merging at least some of blocks in a preset frame structure according to a result of the monitoring, and a framer configured to frame the plurality of communication signals into one frame by including the plurality of communication signals in a block corresponding to a bandwidth of each of the plurality of communication signals according to the reset frame structure.

According to an aspect of an embodiment, the main headend device may transmit a frame transmitted from each of the plurality of extended headend devices to at least one remote device or at least one extension device included in service coverage corresponding to the base station hotel connected to each of the plurality of extended headend devices.

According to an aspect of an embodiment, the main headend device, when an abnormality occurs in a base station hotel corresponding to any one of the plurality of extended headend devices, may transmit a frame received from an extended headend device different from the one of the plurality of extended headend devices to at least one remote device or at least one extension device included in service coverage corresponding to the abnormal base station hotel.

According to an aspect of an embodiment, a method of operating a communication node may comprise receiving a plurality of communication signals transmitted from two or more base stations, and monitoring a bandwidth of each of the received communication signals, resetting a frame structure by merging at least some of blocks in a preset frame structure according to a result of the monitoring, and framing the plurality of communication signals into one frame by including the plurality of communication signals in a block corresponding to a bandwidth of each of the plurality of communication signals according to the reset frame structure.

Advantageous Effects of Disclosure

Methods and apparatuses according to embodiments of the present disclosure may improve the transmission efficiency of communication signals by framing a plurality of communication signals after resetting a frame structure without adjusting a block size within a preset frame structure according to a monitoring result of a bandwidth of each of the plurality of communication signals.

In addition, the methods and apparatuses according to embodiments of the present disclosure transmit communication signals in frame units through an extended headend device that communicates with another base station hotel when an abnormality occurs in a specific base station hotel, thereby improving the transmission efficiency of communication signals even in an abnormal communication situation.

BRIEF DESCRIPTION OF DRAWINGS

A brief description of each drawing is provided to more fully understand drawings recited in the detailed description of the present disclosure.

MODE OF DISCLOSURE

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

A distributed antenna system according to an embodiment of the inventive concept is a coverage system for in-budding service that delivers voice communication and data communication with high quality and seamless access. Further, the distributed antenna system is a system for servicing analog and digital telephone systems being serviced in multiple bands with at least one antenna.

The distributed antenna system according to an embodiment of the inventive concept improves a poor propagation environment in a building, improves a poor received signal strength indication (RSSI) and the overall reception sensitivity of a mobile terminal, chip energy/other interferences (Ec/Io), and provides a mobile communication service to every corner of the building so that a user of the mobile communication service can freely talk anywhere in the building.

The distributed antenna system according to an embodiment of the inventive concept may support the mobile communication standard used worldwide. For example, the distributed antenna system may support a time division duplex (TDD) service as well as a frequency division duplex (FDD) service, a very-high frequency (VHF), an ultra-high frequency (UHF), and frequencies of 700 MHz, 800 MHz, 850 MHz, 900 MHz, 1900 MHz, 2100 MHz, and 2600 MHz bands. Furthermore, the distributed antenna system may support a number of mobile communication standards such as a typical analog mobile communication service, that is, an advanced mobile phone service (AMPS), digital time-division multiple access (TDMA), code-division multiple access (CDMA), wideband code-division multiple access (WCDMA), high-speed downlink packet access (HSDPA), long-term evolution (LTE), LTE-advanced (LTE-A), 5G, and so on.

Hereinafter, embodiments according to the inventive concept will be described in detail in turn.

Figure 1:
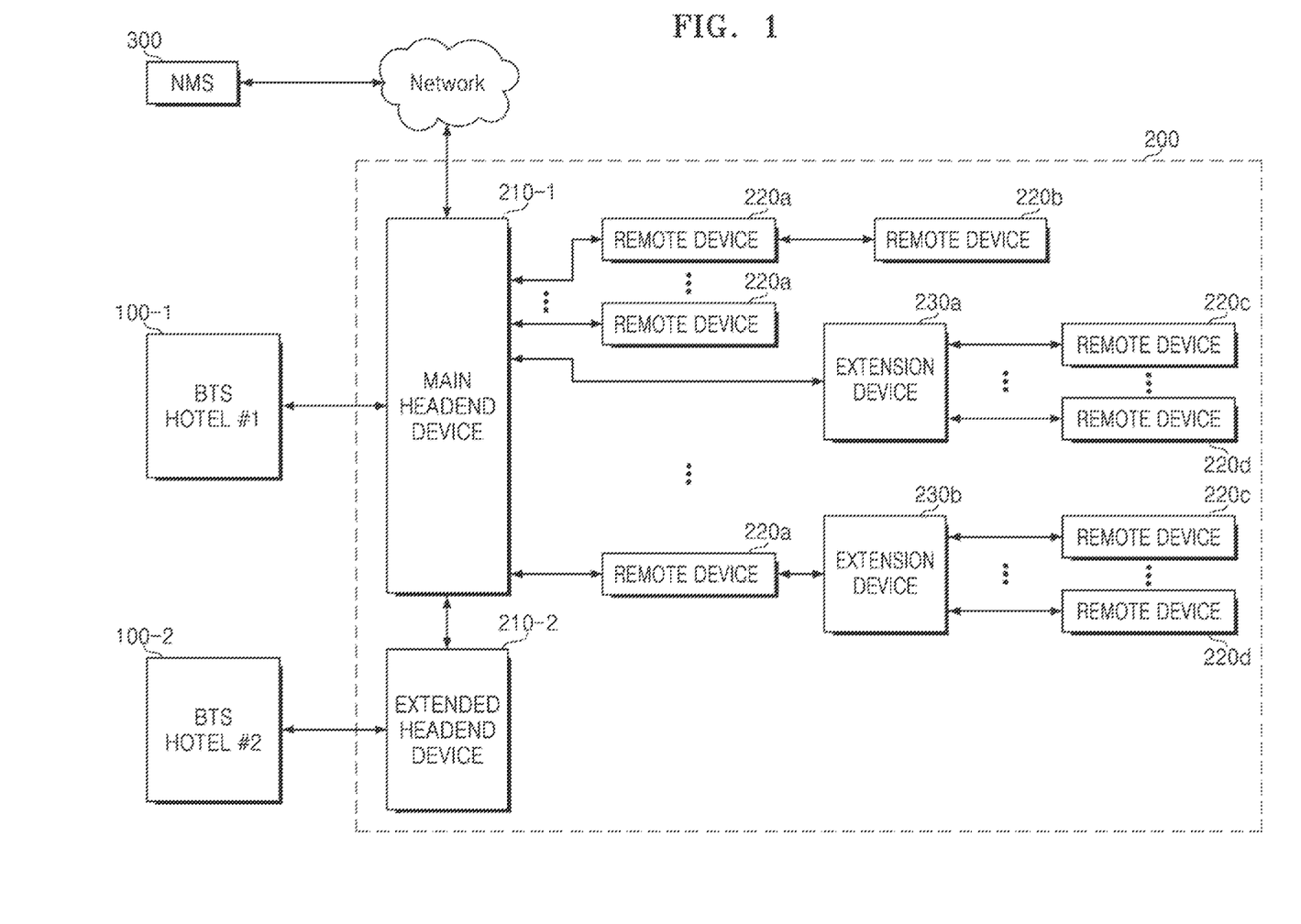
FIG. 1 is a block diagram of a distributed antenna system according to an embodiment of the present disclosure.

FIG. 1 is a block diagram of a distributed antenna system according to an embodiment of the present disclosure.

Referring to FIG. 1, a distributed antenna system (DAS) 200 may include a main headend device 210-1 and an extended headend device 210-2 that constitute a headend node and are communicatively connected to a plurality of base transceiver station (BTS) hotels 100-1 and 100-2, respectively, a plurality of remote devices 220a, 220b, 220c, and 220d that constitute a remote node and are connected to another remote node or communicatively connected to a user terminal by being arranged at respective remote service locations, and extension devices 230a and 230b that constitute an extension node.

Each of the main headend device 210-1, the extended headend device 210-2, the plurality of remote devices 220a, 220b, 220c, and 220d, and the extension devices 230a and 230b may constitute a communication node for transmitting communication signals within the DAS.

According to an embodiment, the DAS 200 may be implemented as an analog DAS.

According to another embodiment, the DAS 200 may be implemented as a digital DAS, and in some cases may be implemented in a hybrid type, for example, in the form of analog processing for some nodes and digital processing for other nodes.

According to another embodiment, the DAS 200 may include some configurations of base stations included in each of the BTS hotels 100-1 and 100-2, or may perform some functions of base stations included in each of the BTS hotels 100-1 and 100-2.

However, FIG. 1 shows an example of a topology of the DAS 200 and various modifications are possible in the DAS 200 considering specificity of installation areas and application fields (e.g., in-building, a subway, a hospital, a stadium, etc.). For example, the number of the main headend device 210-1, the extended headend device 210-2, the remote devices 220a, 220b, 220c, and 220d, and the extension devices 230a and 230b, and a connection relationship between upper and lower ends thereof may be different from FIG. 1.

The extension devices 230a and 230b in the DAS 200 may be utilized when the number of branches of the main headend device 210-1 is limited compared to the number of remote devices to be installed.

Each node in the DAS 200 and its function will be described in more detail. First, the main headend device 210-1 and the extended headend device 210-2 may serve as an interface with a base station. FIG. 1 shows that the main headend device 210-1 is connected to the first BTS hotel 100-1, and the extended headend device 210-2 is connected to the second BTS hotel 100-2.

According to an embodiment, the main headend device 210-1 and the extended headend device 210-2 may be connected to a base station hotel for different service frequency bands or different sectors of a specific operator. In some cases, the main headend device 210-1 may supplement coverage by the extended headend device 210-2.

In general, because a radio frequency (RF) signal transmitted from a base station is a high-power signal, the main headend device 210-1 and the extended headend device 210-2 may attenuate such a high-power RF signal into a signal of power suitable for processing at each node.

The main headend device 210-1 may lower a communication signal (e.g., a high-power RF signal) transmitted from a plurality of base stations included in the first BTS hotel 100-1 to low power. The main headend device 210-1 may be combined with a low-power RF signal, and may distribute the combined signal to the extension device 230a or the remote device 220a.

The extended headend device 210-2 may lower a communication signal (e.g., a high-power RF signal) transmitted from a plurality of base stations included in the first BTS hotel 100-1 to low power. The extended headend device 210-2 may frame a low-power RF signal into one frame, and may distribute a generated frame to the extension device 230a or the remote device 220a through the main headend device 210-1.

According to an embodiment, the main headend device 210-1 and the extended headend device 210-2 may receive a digital format signal (e.g., CPRI, OBSAI, ORI, etc.) from the BTS hotels 100-1 and 100-2, respectively, and process the digital format signal.

According to another embodiment, the main headend device 210-1 and the extended headend device 210-2 may directly receive a baseband signal from the BTS hotels 100-1 and 100-2, respectively, and process the baseband A detailed structure and operation of the main headend device 210-1 will be described later with reference to FIG. 2.

A detailed structure and operation of the extended headend device 210-2 will be described later with reference to FIG. 3.

Each of the remote devices 220a, 220b, 220c, and 220d may separate received coupled signals for each frequency band and perform signal processing such as amplification. Accordingly, each of the remote devices 220a, 220b, 220c, and 220d may transmit a base station signal to a user terminal within service coverage of the remote devices through a service antenna (not shown).

The remote device 220a and the remote device 220b may be connected to each other through an RF cable or wireless communication, and a plurality of remote devices may be connected to each other in a cascade structure if necessary.

The extension device 230a may transmit the received coupled signal to the remote device 220c connected to the extension device 230a.

The extension device 230b may be connected to one end of the remote device 220a and may receive a signal received from the headend device 210 through the remote device 220a in downlink communication. The extension device 230b may transmit the received signal back to the remote device 220d connected to a rear end of the extension device 230b.

According to an embodiment, connection between the BTS hotels 100-1 and 100-2 and the headend devices 210-1 and 210-2 and connection between the remote device 220a and the remote device 220b at a lower end of the main headend device 210-1 may be made through various signal transmission media (e.g., RF cables, twisted cables, UTP cables, etc. in addition to optical cables), and a communication method thereof is not limited to a specific communication method.

In the DAS 200, the main headend device 210-1, the extended headend device 210-2, the remote devices 220a, 220b, 220c, and 220d, and the extension devices 230a and 230b may include an optical transceiver module for transmitting and receiving optical signals through electro-optical conversion/photoelectric conversion, and may further include a wavelength division multiplexing (WDM) element when nodes are connected to each other by a single optical cable.

The DAS 200 may be connected to an external management device (not shown) such as the NMS 300 or a network operation center (NOC) (not shown) via a network. Accordingly, an administrator may remotely monitor the state and problem of each node of the DAS 200, and may remotely control the operation of each node.

Figure 2:
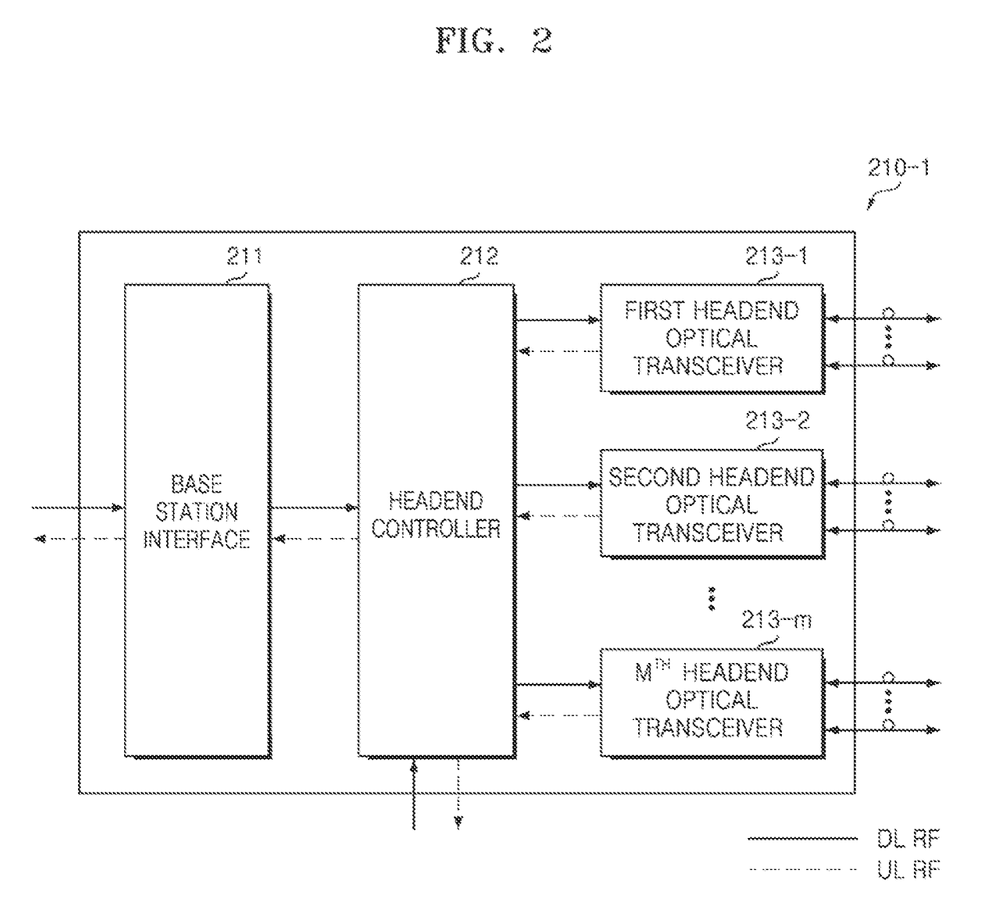
FIG. 2 is a block diagram of a main headend device shown in FIG. 1, according to an embodiment.

FIG. 2 is a block diagram of the main headend device 210-1 shown in FIG. 1, according to an embodiment.

Referring to FIGS. 1 and 2, the main headend device 210-1 may include a base station interface 211, a headend controller 212, and a plurality of headend optical transceivers 213-1 to 213-$m$.

The base station interface 211 may receive a plurality of communication signals transmitted from the first BTS hotel 100-1, for example, a downlink signal. The base station interface 211 may adjust power of the received downlink signal and output the downlink signal to the headend controller 212.

For example, the base station interface 211 may reduce power of the received downlink signal and output the downlink signal with the reduced power to the headend controller 212.

The base station interface 211 may receive a plurality of uplink transmission signals output from the headend controller 212. According to an embodiment, the uplink transmission signals received from the headend controller 212 may be a signal in which uplink transmission signals output from the first to $m^{th}$ headend optical transceivers 213-1 to 213-m, which will be described later below, are combined with each other by the headend controller 212. The uplink transmission signals may include uplink signals of different frequency bands received from user terminals by the remote device 220a directly connected to the main headend device 210-1 or by the extension device 230a, respectively.

The base station interface 211 may adjust power of the uplink signals to output a power-adjusted uplink signal to a corresponding base station in the first BTS hotel 100-1. For example, the base station interface 211 may increase power of an uplink signal, and may output the uplink signal with the increased power to a corresponding base station.

According to an embodiment, the base station interface 211 may include a plurality of interfaces respectively corresponding to a plurality of base stations included in the first BTS hotel 100-1.

The headend controller 212 may combine downlink signals output from the base station interface 211, and may distribute the combined downlink signals to the first to headend optical transceivers 213-1 to 213-m.

The headend controller 212 may combine uplink transmission signals output from the first to $m^{th}$ headend optical transceivers 213-1 to 213-m. The headend controller 212 may distribute the combined uplink signals to the base station interface 211 or a plurality of base station interfaces (not shown) included in the base station interface 211.

The headend controller 212 may distribute and transmit a frame transmitted from the extended headend device 210-2 to the first to $m^{th}$ headend optical transceivers 213-1 to 213-m in downlink communication.

The headend controller 212 may combine uplink signals transmitted from the first to $m^{th}$ headend optical transceivers 213-1 to 213-m in uplink communication and transmit the uplink signals to the extended headend device 210-2.

Each of the first to $m^{th}$ headend optical transceivers 213-1 to 213-m may electro-optically convert an input downlink transmission signal to generate a downlink optical signal. Each of the first to $m^{th}$ headend optical transceivers 213-1 to 213-m may transmit the generated downlink optical signal to the extension devices 230a and 230b or the remote devices 220a to 220d through a corresponding optical transmission medium.

Each of the first to $m^{th}$ headend optical transceivers 213-1 to 213-m may receive an uplink optical signal from the extension devices 230a and 230b or the remote devices 220a to 220d through a corresponding optical transmission medium. Each of the first to $m^{th}$ headend optical transceivers 213-1 to 213-m may photoelectrically convert the received uplink optical signal to restore the uplink transmission signal, Each of the first to $m^{th}$ headend optical transceivers 213-1 to 213-m may output the restored uplink transmission signal to the headend controller 212.

Figure 3:
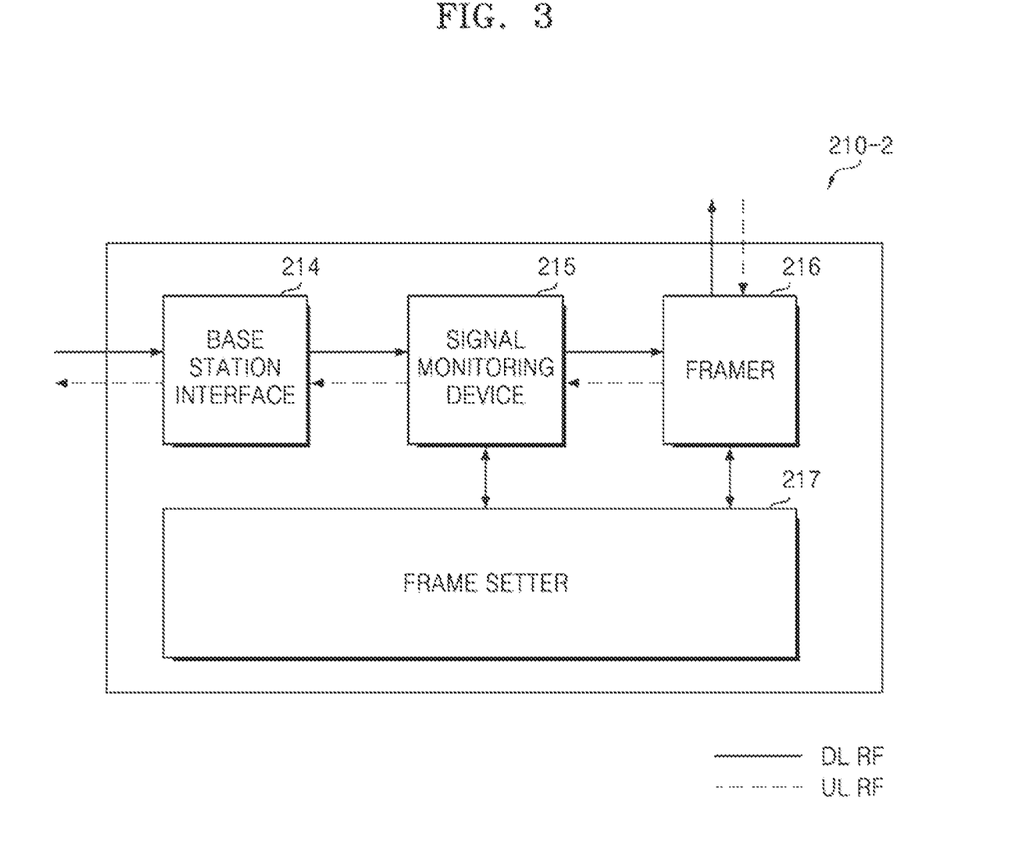
FIG. 3 is a block diagram of an extended headend device shown in FIG. 1, according to an embodiment.
Figure 4:
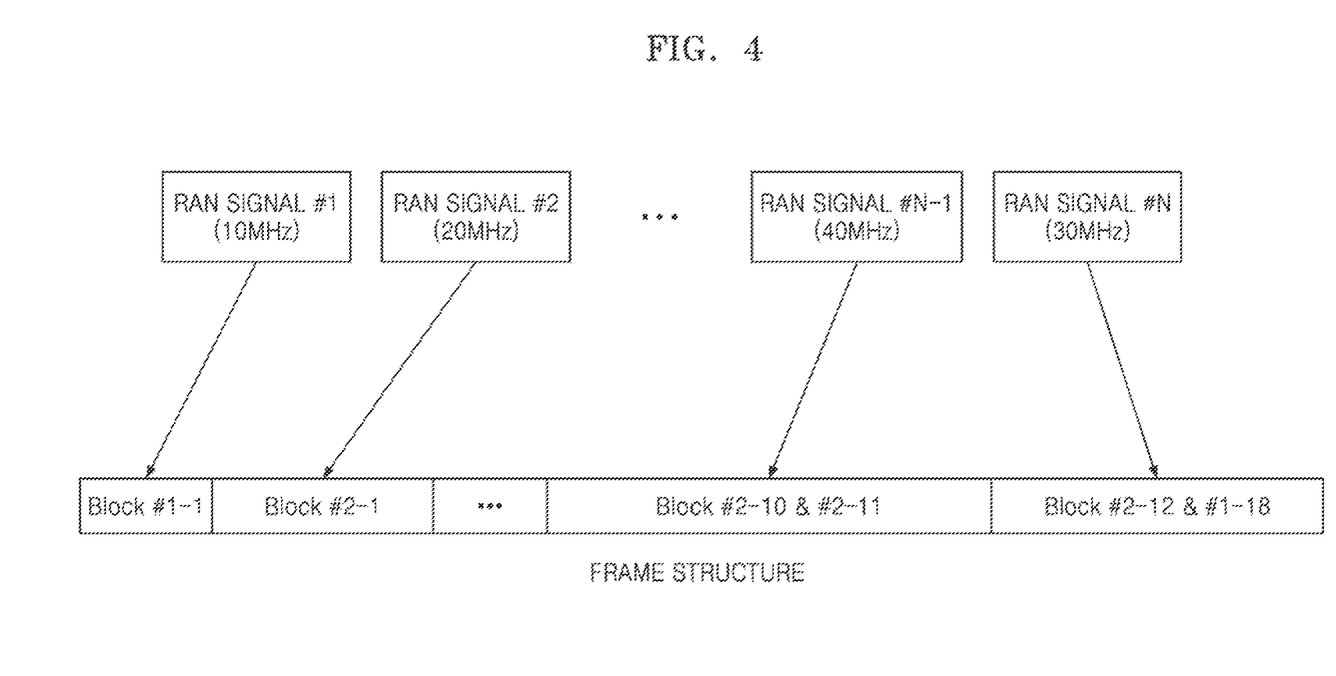
FIG. 4 is a view illustrating an example of a framing structure used in a distributed antenna system, according to an embodiment of the present disclosure.

FIG. 3 is a block diagram of an extended headend device shown in FIG. 1, according to an embodiment. FIG. 4 is a view illustrating an example of a framing structure used in a distributed antenna system, according to an embodiment of the present disclosure.

Referring to FIGS. 1 and 3, the extended headend device 210-2 may include a base station interface 214, a signal monitoring device 215, a framer 216, and a frame setter 217.

The base station interface 214 may operate with substantially the same function as the base station interface 211 of FIG. 2.

The base station interface 214 may receive communication signals (i.e., downlink signals) transmitted from a plurality of base stations included in the second BTS hotel 100-2, and may interface the received communication signals in a form processable within the extended headend device 210-2.

According to an embodiment, the base station interface 214 may include a plurality of base station interfaces respectively corresponding to a plurality of base stations included in the second BTS hotel 100-2.

The plurality of communication signals interfaced by the base station interface 214 (i.e., downlink signals) may be transmitted to the signal monitoring device 215.

The signal monitoring device 215 may receive the plurality of transmitted communication signals, and monitor a bandwidth of each of the plurality of received communication signals.

Referring to FIG. 4 together, the signal monitoring device 215 may monitor a bandwidth of each of a plurality of communication signals RAN SIGNAL #1 to RAN SIGNAL #N, for example, a bandwidth of 10 MHz for the first communication signal RAN SIGNAL #1, a bandwidth of 20 MHz for the second communication signal RAN SIGNAL #2, a bandwidth of 40 MHz for the $(N-1)^{th}$ communication signal RAN SIGNAL #N-1, and 30 MHz for the $N^{th}$ communication signal RAN SIGNAL #N.

Returning to FIG. 3, a result monitored by the signal monitoring device 215 may be transmitted to the frame setter 217.

The frame setter 217 may store information about a preset frame structure.

According to an embodiment, the preset frame structure may include a plurality of blocks configured with two or more different types of block sizes.

According to the monitoring result of the signal monitoring device 215, the frame setter 217 may reset a frame structure by merging at least some of the blocks in the preset frame structure.

According to an embodiment, the frame setter 217 may merge blocks having the same block size with respect to some of the plurality of blocks in the preset frame structure, and may merge blocks having different block sizes with respect to some other blocks.

According to an embodiment, according to the monitoring result of the signal monitoring device 215, the frame setter 217 may set a frame structure by determining a composition ratio of blocks for each type of block size in the preset frame structure.

For example, according to the monitoring result of the signal monitoring device 215, when a ratio of communication signals having a bandwidth of 10 MHz is higher, the frame setter 217 may set a frame structure so that a composition ratio of blocks having a block size of 10 MHz is higher.

According to another embodiment, the frame setter 217 may set a frame structure by determining a composition ratio of blocks for each type of block size in the preset frame structure based on location information of a communication node (e.g., the main headend device 210-1 or the extended headend device 210-2) or the DAS 200.

For example, when the communication node (e.g., the main headend device 210-1 or the extended headend device 210-2) or the DAS 200 is located in a specific country, the frame setter 217 may set a frame structure by determining a composition ratio of blocks for each type of block size by reflecting information about a bandwidth mainly used for transmission of communication signals in a communication service at the location of the communication node (e.g., the main headend device 210-1 or the extended headend device 210-2) or the DAS 200.

Referring to FIG. 4 together, the frame setter 217 may be initially have a frame structure including 18 blocks with a block size of 10 MHz and 12 blocks with a block size of 20 MHz, a total of 30 blocks according to an embodiment.

The signal monitoring device 215 may monitor that the bandwidth of each of the plurality of communication signals RAN SIGNAL #1 to RAN SIGNAL #N is distributed from 10 MHz to 40 MHz.

According to the monitoring result of the signal monitoring device 215, the frame setter 217 may reset a frame structure by merging some of the blocks in the preset frame structure.

For example, the frame setter 217 may generate one block by merging a second-10 block with a block size of 20 MHz (Block #2-10) and a second-11 block with a block size of 20 MHz (Block #2-11) corresponding to the $(N-1)^{th}$ communication signal RAN SIGNAL #N-1 having a bandwidth of 40 MHz.

For example, the frame setter 217 may generate one block by merging a second-12 block with a block size of 20 MHz (Block #2-12) and a first-18 block with a block size of 10 MHz (Block #1-18) corresponding to the $(N-1)^{th}$ communication signal RAN SIGNAL #N-1 having a bandwidth of 40 MHz.

Returning to FIG. 3, the framer 216 may frame a single frame by including a plurality of communication signals in a block corresponding to a bandwidth of each of the plurality of communication signals according to the frame structure reset by the frame setter 217.

Referring to FIG. 4 together, the first communication signal RAN SIGNAL #1 having a bandwidth of 10 MHz may be included in a first-1 block (Block #1-1), the second communication signal RAN SIGNAL #2 having a bandwidth of 20 MHz may be included in a second-1 block (Block #2-1), the $(N-1)^{th}$ communication signal RAN SIGNAL #N-1 having a bandwidth of 40 MHz may be included in a block in which the second-10 block (Block #2-10) and the second-11 block (Block #2-11) are combined, and the $N^{th}$ communication signal RAN SIGNAL #N having a bandwidth of 30 MHz may be included in a block in which the second-12 block (Block #2-12) and the first-18 block (Block #1-18) are combined.

According to an embodiment, the framer 216 may first allocate a block included in a frame to a communication signal having a relatively large bandwidth from among a plurality of communication signals, and include the communication signal in the allocated block.

For example, when the plurality of communication signals shown in FIG. 4 are received, the framer 216 may allocate blocks in the order of the $(N-1)^{th}$ communication signal RAN SIGNAL #N-1, the $N^{th}$ communication signal RAN SIGNAL #N, the second communication signal RAN SIGNAL #2, and the first communication signal RAN SIGNAL #1, and may include the communication signals in the allocated blocks.

Returning to FIG. 3, a frame generated by the framer 216 may be transmitted to the main headend device 210-1.

Figure 5:
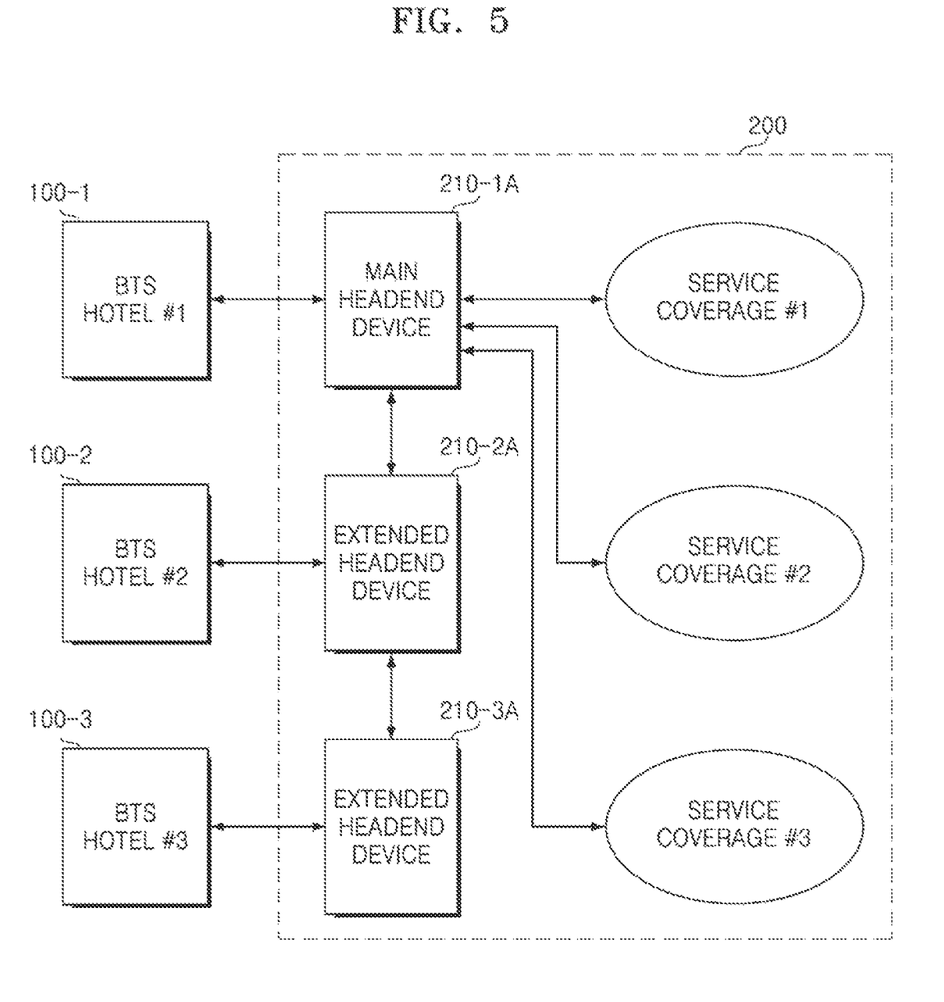
FIG. 5 is a view of a topology of the distributed antenna system shown in FIG. 1, according to an embodiment.

FIG. 5 is a view of a topology of the DAS 200 shown in FIG. 1, according to an embodiment.

The remote devices 220a to 220d and the extension devices 230a and 230b connected to a lower end of a main headend device 210-1A are not shown in FIG. 5, but the main headend device 210-1A may transmit a communication signal or a frame generated based on the communication signal to service coverages (SERVICE COVERAGE #1 to SERVICE COVERAGE #3) through the remote devices 220a to 220d connected to the lower end of the main headend device 210-1A.

FIG. 5 shows a topology in which the main headend device 210-1A is connected in series with a plurality of extended headend devices 210-2A and 210-3A.

In this case, a frame generated by the extended headend device 210-3A may be transmitted to the main headend device 210-1A through the extended headend device 210-2A.

The main headend device 210-1A may transmit a communication signal to the service coverages (SERVICE COVERAGE #1 to SERVICE COVERAGE #3) based on frames respectively received from the extended headend devices 210-2A and 210-3A.

According to an embodiment, when the first BTS hotel 100-1 is sectorized in a form corresponding to the first service coverage (SERVICE COVERAGE #1), the second BTS hotel 100-2 is sectorized in a form corresponding to the second service coverage (SERVICE COVERAGE #2), and a third BTS hotel 100-3 is sectorized in a form corresponding to the third service coverage (SERVICE COVERAGE #3), the main headend device 210-1A may transmit the frames respectively received from the extended headend devices 210-2A and 210-3A to the corresponding service coverages (SERVICE COVERAGE #1 to SERVICE COVERAGE #3) without reconstructing the frames.

According to an embodiment, when an abnormality occurs in the second BTS hotel 100-2 corresponding to the extended headend device 210-2A, the main headend device 210-1A may provide a communication service to the second service coverage (SERVICE COVERAGE #2) based on the frame generated by the extended headend device 210-3A different from the extended headend device 210-2A. That is, the main headend device 210-1A may transmit a frame to at least one remote device or at least one extension device included in the second service coverage (SERVICE COVERAGE #2).

Figure 6:
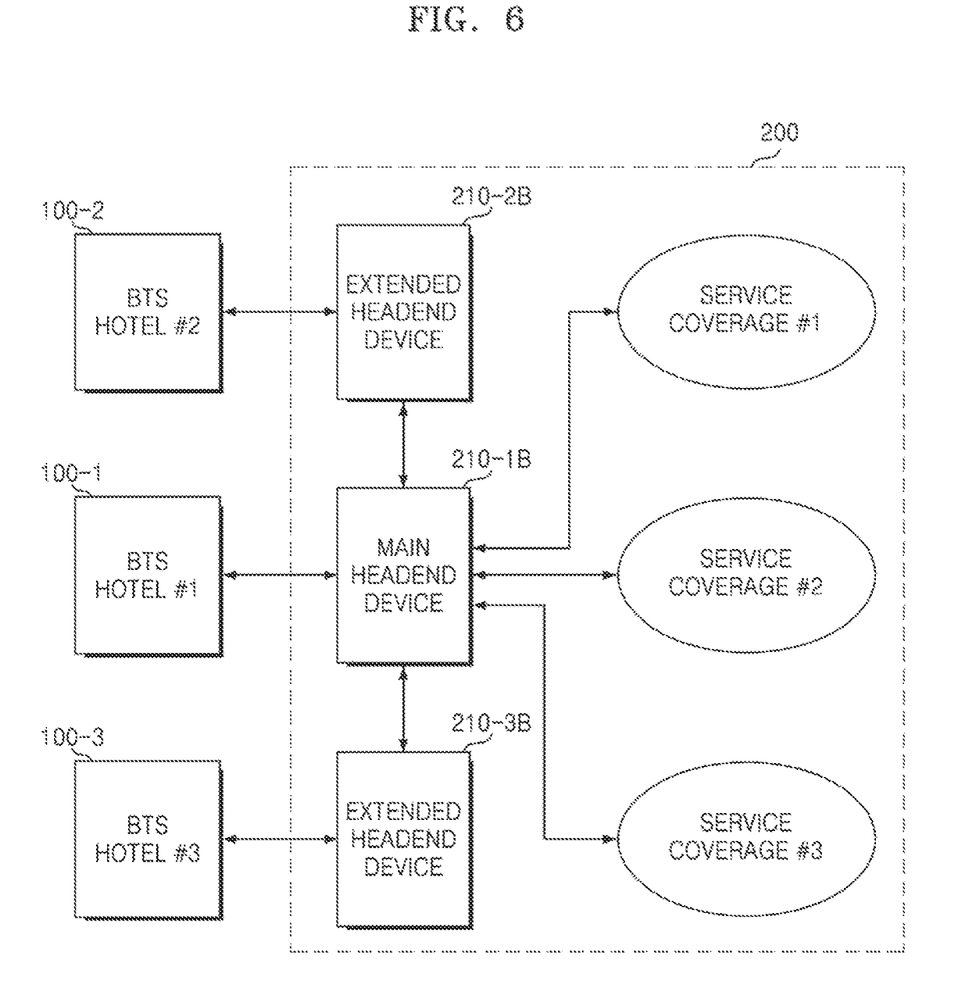
FIG. 6 is a view of a topology of the distributed antenna system shown in FIG. 1, according to another embodiment.

FIG. 6 is a view of a topology of the DAS 200 shown in FIG. 1, according to another embodiment.

The remote devices 220a to 220d connected to a lower end of a main headend device 210-1B and the extension devices 230a and 230b are not shown in FIG. 6, but the main headend device 210-1B may transmit a frame generated based on a communication signal to service coverages (SERVICE COVERAGE #1 to SERVICE COVERAGE #3) through the remote devices 220a to 220d connected to the lower end of the main headend device 210-1B.

FIG. 6 shows a topology in which the main headend device 210-1B is connected in parallel with a plurality of extended headend devices 210-2B and 210-3B.

In this case, frames respectively generated by the extended headend devices 210-2B and 210-3B may be directly transmitted to the main headend device 210-1B.

The main headend device 210-13 may transmit a communication signal to the service coverages (SERVICE COV- ERAGE #1 to SERVICE COVERAGE #3) based on the frames respectively received from the extended headend devices 210-2A and 210-3A.

According to an embodiment, when the first BTS hotel 100-1 is sectorized in a form corresponding to the first service coverage (SERVICE COVERAGE #1), the second BTS hotel 100-2 is sectorized in a form corresponding to the second service coverage (SERVICE COVERAGE #2), and a third BTS hotel 100-3 is sectorized in a form corresponding to the third service coverage (SERVICE COVERAGE #3), the main headend device 210-13 may transmit the frames respectively received from the extended headend devices 210-2B and 210-3B to the corresponding service coverages (SERVICE COVERAGE #1 to SERVICE COVERAGE #3) without reconstructing the frames.

According to an embodiment, when an abnormality occurs in the second BTS hotel 100-2 corresponding to the extended headend device 210-2B, the main headend device 210-1B may provide a communication service to the second service coverage (SERVICE COVERAGE #2) based on the frame generated by the extended headend device 210-3B different from the extended headend device 210-28. That is, the main headend device 210-1B may transmit a frame to at least one remote device or at least one extension device included in the second service coverage (SERVICE COVERAGE #2).

Figure 7:
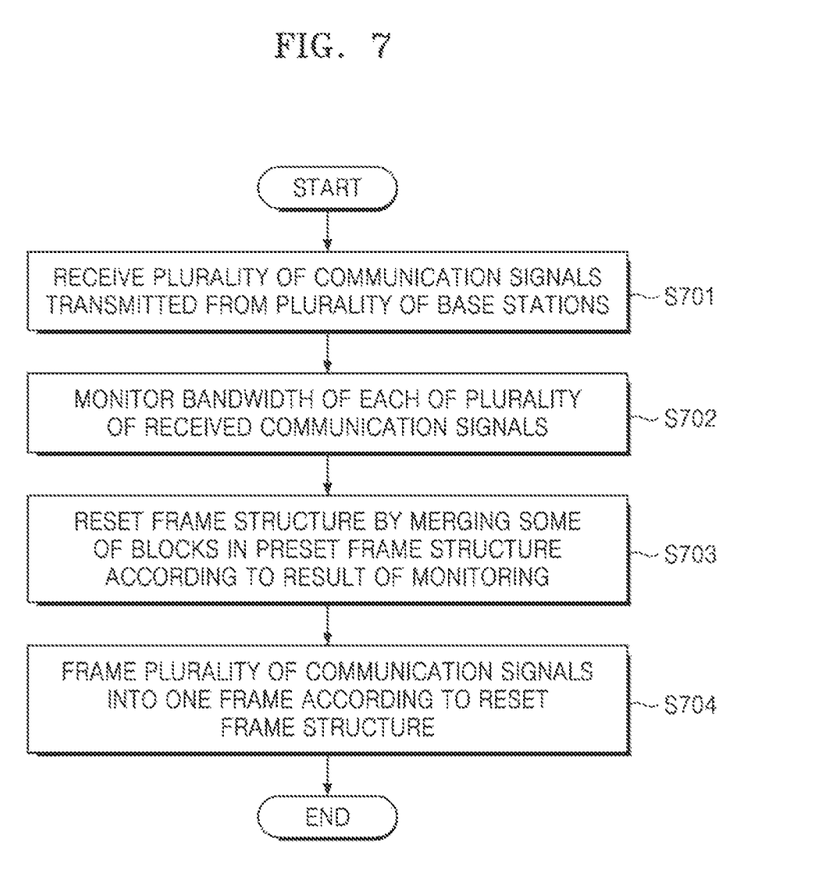
FIG. 7 is a flowchart illustrating a method of operating a communication node according to an embodiment of the present disclosure.

FIG. 7 is a flowchart illustrating a method of operating a communication node according to an embodiment of the present disclosure.

Referring to FIGS. 1 to 7, in operation S701, the communication node (e.g., the extended headend devices 210-2, 210-2A, 210-2B, 210-3A, and 210-3B) may receive a plurality of communication signals transmitted from a plurality of base stations included in BTS hotels (e.g., 100-1 to 100-3).

In operation 3702, the communication node (e.g., the extended headend devices 210-2, 210-2A, 210-2B, 210-3A, and 210-3B) may monitor a bandwidth of each of the plurality of communication signals received in operation S701.

In operation S703, according to a result of the monitoring in operation S702, the communication node (e.g., the extended headend devices 210-2, 210-2A, 210-23, 210-3A, and 210-3B), without changing the size of each of blocks in a preset frame structure, may reset a frame structure by merging at least some of the blocks.

In operation S704, the communication node (e.g., the extended headend devices 210-2, 210-2A, 210-2B, 210-3A, and 210-3B) may frame the plurality of communication signals into one frame by including each of the plurality of communication signals in a block corresponding to the bandwidth of each of the plurality of communication signals according to the frame structure reset in operation S703.

While the present disclosure has been particularly shown and described with reference to embodiments thereof, it will be understood that various changes in form and details may be made therein without departing from the spirit and scope of the following claims.

The invention claimed is:

1. A communication node comprising:
a signal monitoring device configured to receive a plurality of communication signals transmitted from two or more base stations, and to monitor a bandwidth of each of the received communication signals;
a frame setter configured to reset a frame structure by merging at least some of blocks in a preset frame structure according to a result of the monitoring; and
a framer configured to frame the plurality of communication signals into one frame by including the plurality of communication signals in a block corresponding to a bandwidth of each of the plurality of communication signals according to the reset frame structure.

2. The communication node of claim 1, wherein the preset frame structure comprises a plurality of blocks configured with two or more types of block sizes.

3. The communication node of claim 2, wherein the frame setter merges blocks having the same block size with respect to some of the plurality of blocks in the preset frame structure, and merges blocks having different block sizes with respect to some other blocks.

4. The communication node of claim 1, wherein the frame setter sets the frame structure by determining a composition ratio of blocks for each type of block size in the preset frame structure according to the monitoring result of the signal monitoring device.

5. The communication node of claim 1, wherein the frame setter sets the frame structure by determining a composition ratio of blocks for each type of block size in the preset frame structure based on location information where the communication node is installed.

6. The communication node of claim 1, wherein the framer first allocates a block included in the frame to a communication signal having a relatively large bandwidth from among the plurality of communication signals, and comprises the communication signal in the block.

7. A distributed antenna system comprising:
a main headend device; and
a plurality of extended headend devices each configured to receive a plurality of communication signals transmitted from a base station hotel including two or more base stations, and to frame the received communication signals into one frame and transmit the frame to the main headend device devices,
wherein each of the plurality of extended headend devices comprises:
a signal monitoring device configured to receive the plurality of communication signals and to monitor a bandwidth of each of the received communication signals;
a frame setter configured to reset a frame structure by merging at least some of blocks in a preset frame structure according to a result of the monitoring; and
a framer configured to frame the plurality of communication signals into one frame by including the plurality of communication signals in a block corresponding to a bandwidth of each of the plurality of communication signals according to the reset frame structure.

8. The distributed antenna system of claim 7, wherein the main headend device transmits a frame transmitted from each of the plurality of extended headend devices to at least one remote device or at least one extension device included in service coverage corresponding to the base station hotel connected to each of the plurality of extended headend devices.

9. The distributed antenna system of claim 8, wherein the main headend device, when an abnormality occurs in a base station hotel corresponding to any one of the plurality of extended headend devices, transmits a frame received from an extended headend device different from the one of the plurality of extended headend devices to at least one remote device or at least one extension device included in service coverage corresponding to the abnormal base station hotel.

10. A method of operating a communication node, the method comprising:

receiving a plurality of communication signals transmitted from two or more base stations, and monitoring a bandwidth of each of the received communication signals;

resetting a frame structure by merging at least some of blocks in a preset frame structure according to a result of the monitoring; and framing the plurality of communication signals into one frame by including the plurality of communication signals in a block corresponding to a bandwidth of each of the plurality of communication signals according to the reset frame structure.

\* \* \* \* \*